June 5, 1951          J. C. BRIGHT          2,555,869
PIPE COUPLING
Filed Oct. 25, 1945
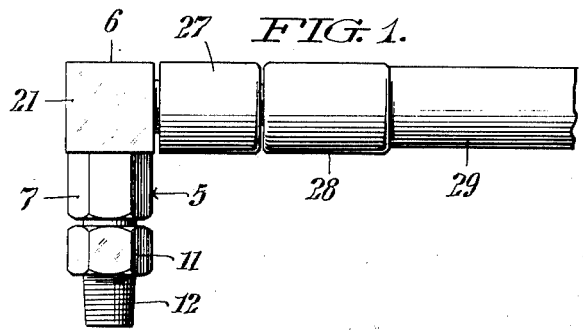
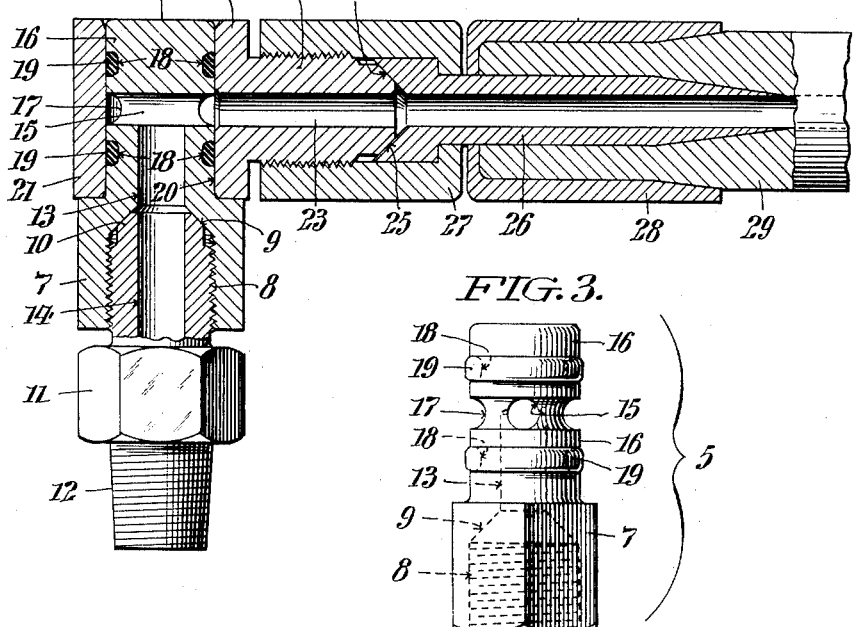
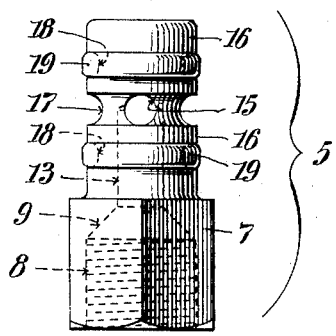
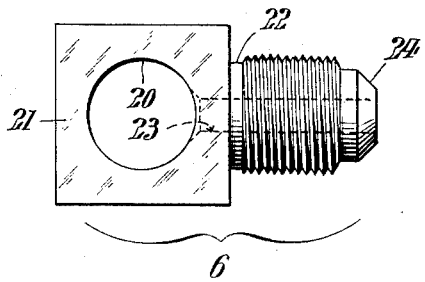
WITNESSES
INVENTOR:
Joseph C. Bright,
BY
ATTORNEYS.

UNITED STATES PATENT OFFICE 2,555,869

PIPE COUPLING

Joseph C. Bright, Aberdeen, Md.

Application October 25, 1945, Serial No. 624,473

1 Claim. (Cl. 285—96.3)

This invention has general reference to pipe-couplings while it relates more particularly, to an improved species thereof wherein the joint is automatically effected and sealed against leakage or disruption incidental to pressure action exerted by the fluid passing through the parts when coupled together.

Another aim of this invention is the provision of an easily made quick-fastening pipe-coupling preferably designed for connecting flexible hose to rigid fittings in hydraulic pipe lines, or to stationary nipples on machines, apparatus, and so forth.

A further aim of this invention is to provide a pipe-coupling of the above indicated type which comprises a minimum of parts that are connectable and disconnectable, almost instantaneously, by simple push and pull action; and one in which the joint is sealed by spaced pressure influenced packing media to each side of the flow passage therethrough.

The stated and other objects, with ancillary advantages, are obtained by the pipe-coupling illustrated in the accompanying sheet of illustrative drawings, and wherein corresponding parts are identified by like reference characters in all the views.

Fig. 1 is an elevation of one form of the improved coupling with a fragmentary portion of flexible hose applied to the female component of said coupling.

Fig. 2 is an enlarged scale longitudinal section through the improved coupling.

Fig. 3 is a view of the male component of the coupling; and

Fig. 4 is a similar view of the female component.

In the drawings, the male component of the improved coupling is comprehensively designated by the reference character 5, while the female component is similarly distinguished by the reference 6.

The male component 5, as best shown in Figs. 2 and 3, conveniently, embodies a polygonally-shaped head 7 having a screw threaded bore 8 and tapering seat 9 for engagement by the complementally beveled inner end 10 of a conventional union 11 having an exteriorly-threaded extension 12, for attachment to a pressure flow pipe, or otherwise as desirable or expedient. It is also to be observed that the member 5 is provided with a smaller diameter axial bore 13, corresponding with the bore 14 of the union 11, said bore 13 communicating centrally into a diametric passage 15, through the shank 16 of said member 5, such passage opening out at both ends into a, preferably semi-circular section, groove 17 around said shank. The male member 5 is also provided with spaced annular grooves 18, to each side of the groove 17, for reception of resilient material packing or sealing-rings 19; while it is to be noted that the diameter of the shank 16 is such as to ensure it being a snug fit in the coupler-bore 20 provided for its reception in the cubiform-head 21, for example only, of the female member 6.

The female member 6, in addition to the cubiform-head 21, embodies a preferably rectangularly-related tubular stem 22 the bore 23 of which is slightly less than the extension bore 13 of the male member 5 for a reason later explained; while the said stem 22 is circumferentially chamfered at 24 for frictional coaction with the seat 25 of a standard type hose-nipple 26, when the latter is attached to said member 6, by a screw-threaded clamping sleeve 27, as readily understood by those conversant with the art. The nipple 26, with an associated clamping-sleeve 28 jointly serve to connect up the flexible hose 29 in an obvious manner; while it is to be particularly noted that the bores through the components 5 and 6 are angularly related; or in the particular showing the bores 13, 15 and 20, 23 are T-shaped or cruciform.

In use it will now be readily understood the two members 5, 6, with the sealing rings 19 in place, are readily snapped together by simply inserting the shank or stem 16 into the coupler bore 20 under axial pressure; the member 5 having been previously attached where desired by aid of the union 11, and the member 6 having had the hose 29 connected thereto by the clamping sleeve 27. Having connected the members 5, 6, as just stated, it will be quite obvious that fluid flowing through the coupling under pressure will fill the extension bore 13, diametric passage 15 and associated groove 17 with resultant exertion of its pressure against both the rings 19 equally as well as in opposite directions outwardly, whereby said rings are forced into effective engagement with the bore 20 and the members 5, 6 are positively restrained or secured against relative separation, as long as the fluid pressure continues therein; it being further noted that the pressure in the groove 17 and passage 15 is boosted by the difference in the size or diameters of the bore 13 and that of the bore 23 through the tubular stem 22.

From the foregoing it will be clearly apparent that this invention embodies all of the aims stated in the prefatory paragraphs of this specification; and while there has been disclosed one practical embodiment of said invention the same is not to be considered conclusive, as it will be self-evident that the shape and size of the parts may be considerably varied, and other applications of the device evolved without departing from the spirit and scope thereof as more particularly defined in the following claim.

Having thus described my invention, I claim:

In a pipe coupling of the type described the combination of a male component including a head and shank portions; a screw-threaded bore and taper seat in the head portion; an axially-aligned T-shape smaller bore extending from said seat inwardly of the shank with the cross-portion diametrically disposed and having communication at both ends into a semi-circular section circumferential groove around said shank; annular grooves for suitable packing rings spacedly related to each side of the semi-circular groove; a female component embodying a cubiform-head and a rectangularly-related tubular stem the bore of which is slightly less in diameter than the extension bore in the male component; and a coupler-bore centrally of the cubiform-head for push-on and push-off pivotal engagement on the male component shank and associated packing rings.

JOSEPH C. BRIGHT.

REFERENCES CITED

The following references are of record in the file of this patent:

UNITED STATES PATENTS

| Number | Name | Date |
|---|---|---|
| 2,307,328 | Martin | Jan. 5, 1943 |
| 2,400,658 | Shepherd | May 21, 1946 |
| 2,429,782 | Versoy | Oct. 28, 1947 |

FOREIGN PATENTS

| Number | Country | Date |
|---|---|---|
| 206,778 | Great Britain | Nov. 15, 1923 |